United States Patent
Huang et al.

(10) Patent No.: US 8,957,875 B2
(45) Date of Patent: Feb. 17, 2015

(54) METHOD FOR ADJUSTING SENSITIVITY OF TOUCH PANELS

(75) Inventors: Cheng-Tai Huang, Hsinchu (TW); Chien-Yung Cheng, Hsinchu (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 309 days.

(21) Appl. No.: 13/591,338

(22) Filed: Aug. 22, 2012

(65) Prior Publication Data

US 2013/0169588 A1    Jul. 4, 2013

(30) Foreign Application Priority Data

Dec. 29, 2011 (TW) ................................. 100149637

(51) Int. Cl.
G06F 3/044 (2006.01)

(52) U.S. Cl.
USPC ........ 345/174; 345/173; 345/178; 178/18.01; 178/18.02; 178/18.03; 178/18.04; 178/18.05; 178/18.06

(58) Field of Classification Search
USPC ....................... 345/174; 178/18.06
See application file for complete search history.

(56) References Cited

U.S. PATENT DOCUMENTS

2011/0018837 A1*  1/2011  Chen et al. .............. 345/174
2012/0293447 A1*  11/2012  Heng et al. .............. 345/174

* cited by examiner

*Primary Examiner* — Grant Sitta
*Assistant Examiner* — Amen Bogale
(74) *Attorney, Agent, or Firm* — Novak Druce Connolly Bove + Quigg LLP

(57) ABSTRACT

The present application relates to a method for adjusting the sensitivity of a touch panel. A look up table is built. The look up table includes a charging station look up table and a discharging station look up table. The charging station look up table includes a threshold value ($V_{0m}$) of a touch signal, an electrical quantity ($A_{0i}$) corresponding to the threshold value ($V_{0m}$), and a computational method $g_1$. The discharging station look up table includes the threshold value ($V_{0m}$), the electrical quantity ($A_{0i}$), and a computational method $g_2$. The current electrical quantity and whether the capacitive touch panel is charging are detected. According to the current electrical quantity, the state of charging or discharging, and the computational method $g_1$ or $g_2$, the threshold value ($V_{0m}$) is adjusted.

8 Claims, 8 Drawing Sheets

Building a charging station look up table and a discharging station look up table

↓

Detecting current electrical quantity, and determining whether the touch panel is charging

↓

Adjusting threshold value ($V_{0m}$)

Detecting an electrical quantity ($A_{0i}$) of a moment (t) and a first sensing signal ($V_{0i}$) of a touch point, and setting a threshold value ($V_{0m}$)

Detecting an electrical quantity ($A_{1i}$) of the next moment (t+1) and a second sensing signal ($V_{1i}$) of the touch point, and setting a threshold value ($V_{1m}$)

Building an equation $f_1$ and an equation $f_2$, $f_1(V_{0i}, A_{0i}, A_{1i}) = V_{1i}$, $f_2(V_{0m}, V_{1i}, V_{0i}) = V_{1m}$, according to the equation $f_1$ and $f_2$, to obtain a computational method $g_1$, $g_1(V_{0m}, A_{0i}, A_{ni}) = V_{nm}$

FIG. 5

Detecting the electrical quantity ($A_{0i}$) of a moment (t), and a third sensing signal ($V_{0i}$) of a touch point, and setting the threshold value ($V_{0m}$)

↓

Detecting an electrical quantity ($A_{1i}'$) of the next moment (t+1) and a fourth sensing signal ($V_{1i}'$) of the touch point, and setting a threshold value ($V_{1m}'$)

↓

Building an equation $f_1'$ and an equation $f_2'$, $f_1'(V_{0i}, A_{0i}, A_{1i}') = V_{1i}'$, $f_2'(V_{0m}, V_{1i}', V_{0i}) = V_{1m}'$, according to the equations $f_1'$ and $f_2'$, to obtain the computational method $g_2$, $g_2(V_{0m}, A_{0i}, A_{ni}') = V_{nm}'$

FIG. 6

METHOD FOR ADJUSTING SENSITIVITY OF TOUCH PANELS

RELATED APPLICATIONS

This application claims all benefits accruing under 35 U.S.C. §119 from Taiwan Patent Application No. 100149637, filed on Dec. 29, 2011 in the Taiwan Intellectual Property Office, the disclosure of which is incorporated herein by reference.

BACKGROUND

1. Technical Field

The present application relates to a method for adjusting the sensitivity of touch panels.

2. Discussion of Related Art

In recent years, various electronic products have been equipped with optically transparent touch panels in front of their display devices such as liquid crystal panels. A user of such electronic apparatus can press the touch panel with a finger or a stylus while visually observing the display device through the touch panel.

Capacitive touch panels have been widely used due to their higher sensitivity. However, capacitive touch panels are susceptible to interference, such as static electricity. If the capacitive touch panel is charging at the same time the capacitive touch panel is touched by a user, a total capacitance multiply effect will be formed between the capacitive touch panel and the user. The capacitive touch panel is too sensitive at this moment. When electrical quantity of the capacitive touch panel gradually reduces, the sensitivity of the capacitive touch panel gradually reduces. The over-sensitivity and the reduction of sensitivity of the capacitive touch panel affect the use of the capacitive touch panel.

What is needed, therefore, is to provide a touch panel which can overcome the shortcoming described above.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 5 is a flowchart of one embodiment of a method for building a look up table in a charging station.

FIG. 6 is a flowchart of one embodiment of a method for building a look up table in a discharging station.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
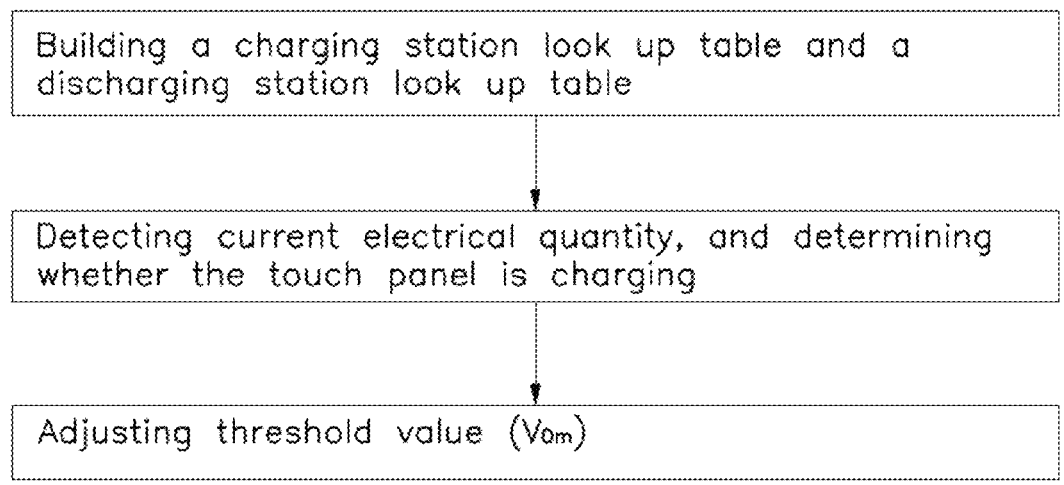
FIG. 1 is a flowchart of one embodiment of a method for adjusting the sensitivity of touch panel.

Referring FIG. 1, one embodiment of a method for adjusting the sensitivity of a touch panel is shown. The method includes the steps of:

step (S1), building a look up table including a charging station look up table and a discharging station look up table, wherein the charging station look up table includes a threshold value ($V_{Om}$) of a touch signal, an electrical quantity ($A_{Oi}$) corresponding to the threshold value ($V_{Om}$), and a computational method $g_1$, the discharging station look up table includes the threshold value ($V_{Om}$), the electrical quantity ($A_{Oi}$) corresponding to the threshold value ($V_{Om}$), and a computational method $g_2$;

step (S2), detecting current electrical quantity, and determining whether the touch panel is charging; and step (S3), adjusting the threshold value ($V_{Om}$), according to the current electrical quantity, charging station, and the computational method $g_1$ in the charging station look up table, or current electrical quantity, discharging station, and the computational method $g_2$ in the discharging station look up table.

The method for adjusting the sensitivity of the touch panel is suitable for a capacitive touch panel.

Figure 2:
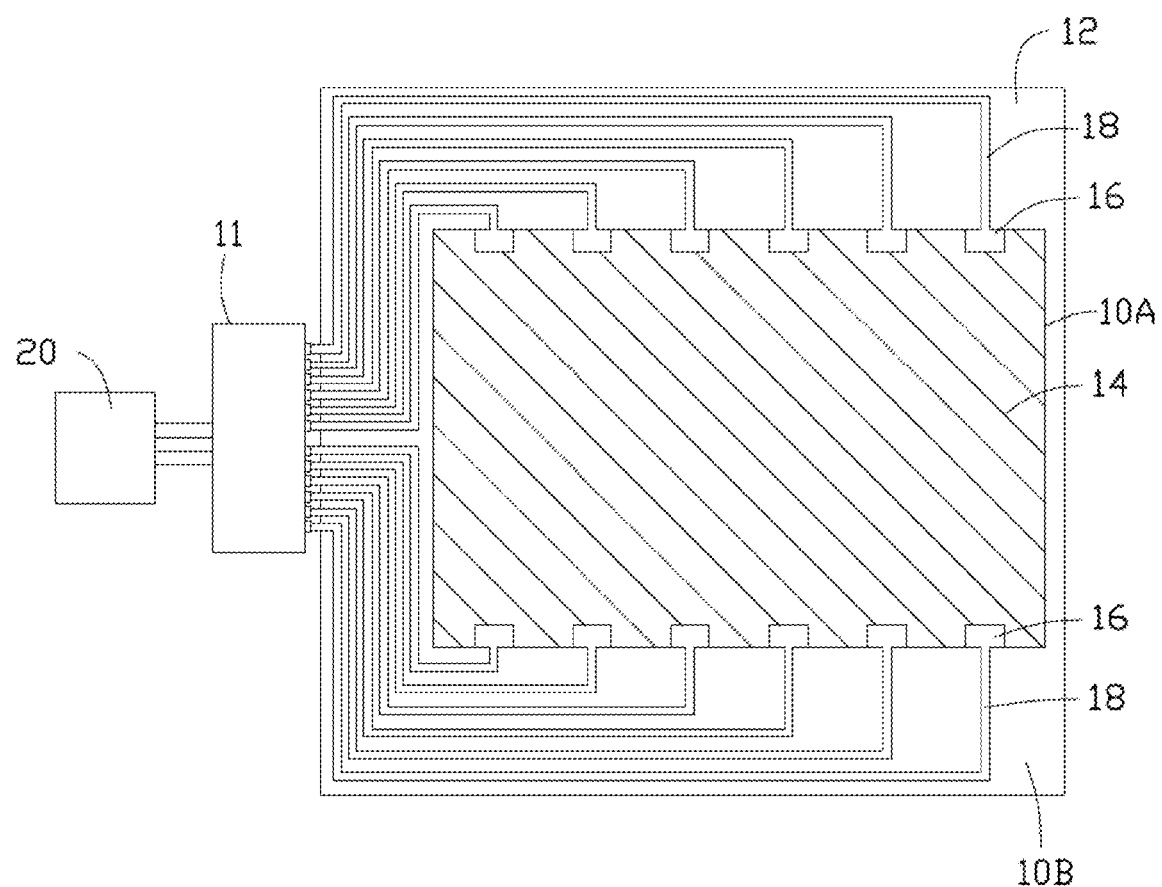
FIG. 2 is a schematic, top view of a touch panel.
Figure 3:
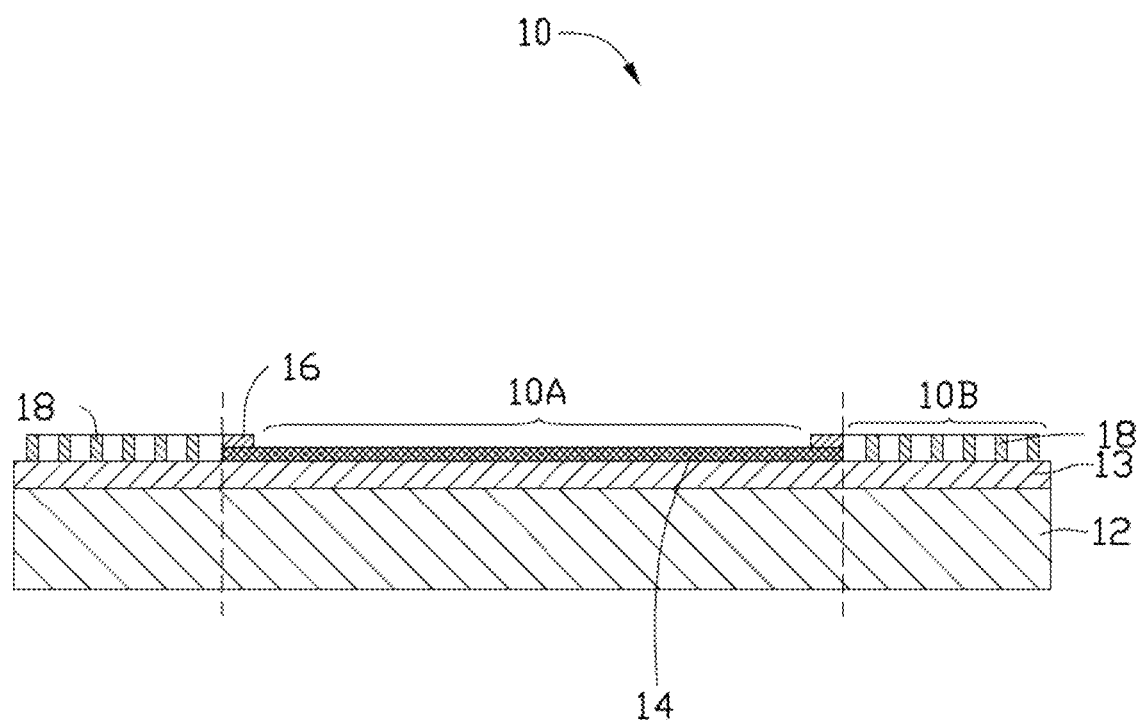
FIG. 3 is a schematic, cross-sectional view of the touch panel of FIG. 1.

Referring to FIG. 2 and FIG. 3, a capacitive touch panel 10 of one embodiment is shown. The touch panel 10 includes a substrate 12, an adhesive layer 13, a transparent conductive layer 14, a plurality of electrodes 16, and a conductive trace 18.

The touch panel 10 defines two areas: a touch-view area 10A and a trace area 10B. The touch-view area 10A can be touched and viewed to realize the control function. The trace area 10B is usually a periphery area of the touch panel 10 which can be used to support the conductive trace 18. The touch-view area 10A has a relatively large area which includes a center area of the touch panel 10. The trace area 10B is located on at least one side of the touch-view area 10A. The positional relationship of the touch-view area 10A and the trace area 10B can be selected according to need. In one embodiment, the touch-view area 10A is the center region having the same shape as the shape of the touch panel 10 and surrounded by the trace area 10B.

The adhesive layer 13 is located on a surface of the substrate 12. The transparent conductive layer 14 and the conductive trace 18 are located on a surface of the adhesive layer 13. The plurality of sensing electrodes 16 is located on a surface of the transparent conductive layer 14. The transparent conductive layer 14 is located only on the touch-view area 10A. The conductive trace 18 is located only on the trace area 10B. The plurality of sensing electrodes 16 is located on at least one side of the transparent conductive layer 14 and electrically connected with the transparent conductive layer 14 and the conductive trace 18. The plurality of sensing electrodes 16 is spaced from each other. The conductive trace 18 includes a plurality of conductive wires. The number of the plurality of conductive wires is the same as the number of the plurality of sensing electrodes 16. Each of the plurality of conductive wires has a first end and a second end. The first end of each of the plurality of conductive wires is connected to each of the plurality of sensing electrodes 16. The second end of each of the plurality of conductive wires is electrically connected with an external controller 11. The transparent conductive layer 14 is electrically connected with the external controller 11 through the conductive trace 18 and the plurality of sensing electrodes 16, to transmit electrical signals between the plurality of sensing electrodes 16 and the external controller 11.

The adhesive layer 13 is optional. The transparent conductive layer 14, the plurality of sensing electrodes 16 and the conductive trace 18 are plated on the surface of the substrate 12. The transparent conductive layer 14 has a good adhesive property, and the transparent conductive layer 14 can be directly bonded to the surface of the substrate 12 without the adhesive layer 13.

The transparent conductive layer 14 can be a carbon nanotube layer, a conductive indium tin oxide (ITO) layer, or a conductive antimony tin oxide (TAO) layer.

The carbon nanotube layer includes a carbon nanotube film. The carbon nanotube film includes a plurality of carbon nanotubes. The carbon nanotube film can be a substantially pure structure of carbon nanotubes, with few impurities and chemical functional groups. A majority of the carbon nanotubes are arranged to extend along the direction substantially parallel to the surface of the carbon nanotube film.

The carbon nanotube film is a free-standing structure. The term "free-standing structure" means that the carbon nanotube film can sustain the weight of itself when it is hoisted by a portion thereof without any significant damage to its structural integrity. Thus, the carbon nanotube film can be suspended by two spaced supports. The free-standing carbon nanotube film can be laid on the epitaxial growth surface directly and easily.

Figure 4:
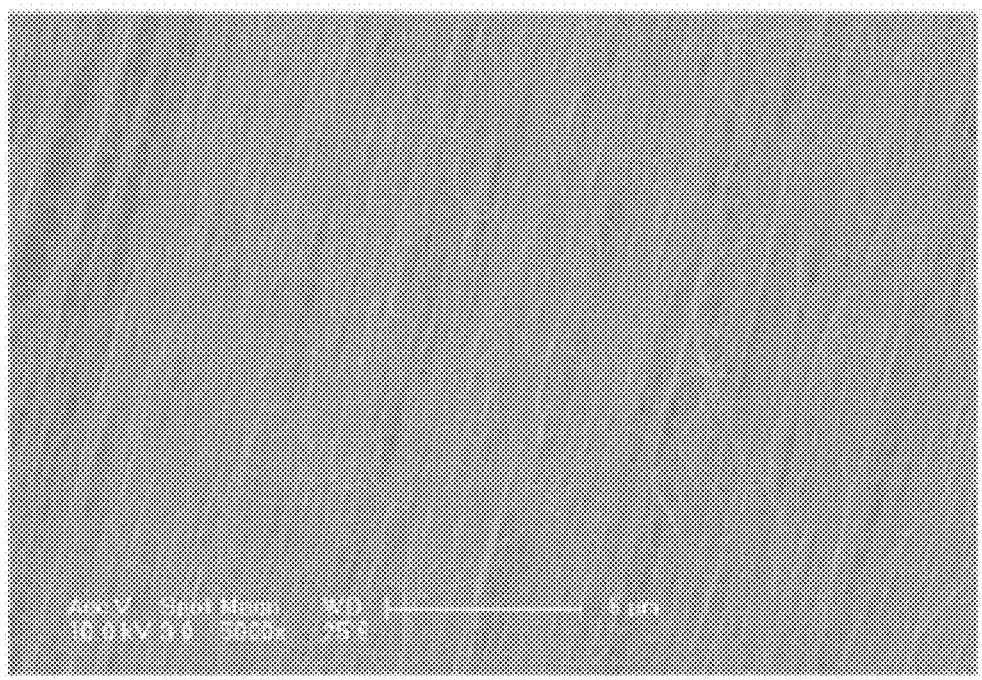
FIG. 4 shows a Scanning Electron Microscope (SEM) image of a carbon nanotube layer.

In one embodiment, the transparent conductive layer 14 is a single carbon nanotube film. The carbon nanotube film includes a plurality of successive and oriented carbon nanotubes joined end-to-end by van der Waals attractive force therebetween. The carbon nanotube film is a free-standing film. Referring to FIG. 4, each carbon nanotube film includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. The carbon nanotubes in the carbon nanotube film are oriented along a preferred orientation.

In step (S1), the look up table can be stored on the external controller 11. The look up table includes the charging station look up table and the discharging station look up table.

Referring to FIG. 5, one embodiment of a method for building the charging station look up table based on the capacitive touch panel 10 includes the following steps:

step (S11), detecting the electrical quantity ($A_{0i}$) of a moment (t), and touching the transparent conductive layer 14 at the moment (t), to obtain a first sensing signal ($V_{0i}$) of a touch point 19, and setting the threshold value ($V_{0m}$), wherein the sensing signal ($V_{0i}$) is greater than the threshold value ($V_{0m}$);

step (S12), detecting an electrical quantity ($A_{1i}$) of the next moment (t+1), and touching the transparent conductive layer 14 at the moment (t+1), to obtain a second sensing signal ($V_{1i}$) of the touch point 19, and setting a threshold value ($V_{1m}$) of the touch signal, wherein the sensing signal ($V_{1i}$) is greater than the threshold value ($V_{1m}$), the electrical quantity ($A_{1i}$) at the moment (t+1) is greater than the electrical quantity ($A_{0i}$) at the moment (t), and $V_{0i}-V_{0m}=V_{1i}-V_{1m}$; and step (S 13), building an equation $f_1$ and an equation $f_2$, wherein the equation $f_1$ can be built using various algorithms as long as the equation $f_1$ meets the conditions: $f_1(V_{0i}, A_{0i}, A_{1i})=V_{1i}$, the equation $f_2$ can be built using various algorithms as long as the equation $f_2$ meets the conditions: $f_2(V_{0m}, V_{1i}, V_{0i})=V_{1m}$, according to the equation $f_1$ and the equation $f_2$, to obtain the computational method $g_1$, the computational method $g_1$ meets the conditions: $g_1(V_{0m}, A_{0i}, A_{ni})=V_{nm}$, wherein an electrical quantity of a moment (t+n) is defined as $A_{ni}$, a threshold value at the moment (t+n) is defined as $V_{nm}$.

In the process of charging, the electrical quantity of the capacitive touch panel 10 rapidly rises, so the electrical quantity ($A_{1i}$) at the moment (t+1) is greater than the electrical quantity ($A_{0i}$) at the moment (t).

The letters i and n represent the moment of touching the capacitive touch panel 10. i=1, 2, 3 . . . (i>0), m=0, 1, 2, 3 . . . (m≥0), n=0, 1, 2, 3 . . . (n≥0).

The equations $f_1$ and $f_2$ can be built using various algorithms as long as the equations $f_1$ and $f_2$ meet the conditions: $f_1(V_{0i}, A_{0i}, A_{1i})=V_{1i}$, $f_2(V_{0m}, V_{1i}, V_{0i})=V_{1m}$. In one embodiment, the equation $f_1$ reflects a ratio of the product of the sensing signal ($V_{0i}$) and the electrical quantity ($A_{1i}$) to the electrical quantity ($A_{0i}$). The equation $f_1$ can be represented by $$\frac{L_{0i} \times V_{0i} \times A_{1i}}{A_{0i}} = V_{1i},$$

wherein $L_{0i}$ is a coefficient of $$\frac{V_{0i} \times A_{1i}}{A_{0i}}$$

for converting into $V_{1i}$. The equation $f_2$ reflects a ratio of the product of the threshold value ($V_{0m}$) and the sensing signal ($V_{1i}$) to the sensing signal ($V_{0i}$). The equation $f_2$ can be represented by $$\frac{K_{0i} \times V_{0m} \times V_{1i}}{V_{0i}} = V_{1m},$$

wherein $K_{0i}$ is a coefficient of $$\frac{V_{0m} \times V_{1i}}{V_{0i}}$$

for converting into $V_{1m}$. According to the equations $f_1$ and $f_2$, the computational method $g_1$ can be obtained. The computational method $g_1$ meets the condition:

$$\frac{L_{0i} \times K_{0i} \times V_{0m} \times A_{ni}}{A_{0i}} = V_{nm}.$$

Referring to FIG. 6, one embodiment of a method for building the discharging station look up table based on the capacitive touch panel 10 includes the following steps:

step (S11a), detecting the electrical quantity ($A_{0i}$) of a moment (t), and touching the transparent conductive layer 14 at the moment (t), to obtain a third sensing signal ($V_{0i}$) of the touch point 19, and setting the threshold value ($V_{0m}$), wherein the sensing signal ($V_{0i}$) is greater than the threshold value ($V_{0m}$);

step (S12a), detecting an electrical quantity ($A_{1i}'$) of the next moment (t+1), and touching the transparent conductive layer 14 at the moment (t+1), to obtain a fourth sensing signal ($V_{1i}'$) of the touch point 19, and setting a threshold value ($V_{1m}'$) of the touch signal, wherein the sensing signal ($V_{1i}'$) is greater than the threshold value ($V_{1m}'$), the electrical quantity ($A_{0i}$) at the moment (t) is greater than the electrical quantity ($A_{1i}'$) at the moment (t+1), and $V_{0i}-V_{0m}=V_{1i}'-V_{1m}'$; and step (S13a), building an equation $f_1'$ and an equation $f_2'$, the equation $f_1'$ can be built using various algorithms as long as the equation $f_1'$ meets the conditions: $f_1'(V_{0i}, A_{0i}, A_{1i}')=V_{1i}'$, the equation $f_2'$ can be built using various algorithms as long as the equation $f_2'$ meets the conditions: $f_2'(V_{0m}, V_{1i}', V_{0i})=V_{1m}'$, according to the equations $f_1'$ and $f_2'$, to obtain the computational method $g_2$, the computational method $g_2$ meets the conditions: $g_2(V_{0m}, A_{0i}, A_{ni}')=V_{nm}'$, wherein an electrical quantity of a moment (t+n) is defined as $A_{ni}'$, a threshold value at the moment (t+n) is defined as $V_{nm}'$.

In the process of discharging, the electrical quantity of the capacitive touch panel 10 gradually reduces, so the electrical quantity ($A_{0i}$) at the moment (t) is greater than the electrical quantity ($A_{1i}'$) at the moment (t+1).

The letters i and n represent the moment of touching the capacitive touch panel 10. i=1, 2, 3 . . . (i>0), m=0, 1, 2, 3 . . . (m≥0), n=0, 1, 2, 3 . . . (n≥0).

The equations $f_1'$ and $f_2'$ can be built using various algorithms as long as the equations $f_1'$ and $f_2'$ meet the conditions: $f_1'(V_{0i}, A_{0i}, A_{1i}')=V_{1i}'$, $f_2'(V_{0m}, V_{1i}', V_{0i})=V_{1m}'$. In one embodiment, the equation $f_1'$ reflects a ratio of the product of the sensing signal ($V_{0i}$) and the electrical quantity ($A_{1i}'$) to the electrical quantity ($A_{0i}$). The equation $f_1'$ can be represented by $$\frac{M_{0i} \times V_{0i} \times A_{1i}'}{A_{0i}} = V_{1i}',$$

wherein $M_{0i}$ is a coefficient of $$\frac{V_{0i} \times A_{1i}'}{A_{0i}}$$

for converting into $V_{1i}'$. The equation $f_2'$ reflects a ratio of the product of the threshold value ($V_{0m}$) and the sensing signal ($V_{1i}'$) to the sensing signal ($V_{0i}$). The equation $f_2'$ can be represented by $$\frac{N_{0i} \times V_{0m} \times V_{1i}'}{V_{0i}} = V_{1m}',$$

wherein $N_{0i}$ is a coefficient of $$\frac{V_{0m} \times V_{1i}'}{V_{0i}}$$

for converting into $V_{1m}'$. According to the equations $f_1'$ and $f_2'$, the computational method $g_2$ can be obtained. The computational method $g_2$ meets the condition:

$$\frac{M_{0i} \times N_{0i} \times V_{0m} \times A_{ni}'}{A_{0i}} = V_{nm}'.$$

The touch point 19 can be a single touch point or a plurality of touch points formed by an input device sliding on the capacitive touch panel 10. The touch point 19 can also be a plurality of touch points formed by a plurality of input devices touching the capacitive touch panel 10. In one embodiment, the touch point 19 includes the plurality of touch points. The threshold values of the plurality of touch points are the same at the same moment. The threshold value and the sensing signal can be a voltage value, or the threshold value and the sensing signal can be a capacitance value.

In step (S2), an electrical quantity ($A_{ni}$) is detected at a moment, and whether the capacitive touch panel 10 is charging is also detected at the moment. The electrical quantity ($A_{ni}$) and a signal of whether the capacitive touch panel 10 is charging are transmitted to the capacitive touch panel 10 by a device 20. A method for transmitting the electrical quantity ($A_{ni}$) to the capacitive touch panel 10 can be selected according to need. A method for transmitting the signal of whether the capacitive touch panel 10 is charging to the capacitive touch panel 10 can be selected according to need. The method for transmitting the electrical quantity ($A_{ni}$) and the signal can be I2C, SPI, UART, and GPIO.

In step (S3), the capacitive touch panel 10 receives the signal of the charging station and the electrical quantity at the charging station. The capacitive touch panel 10 receives the signal of the discharging station and the electrical quantity at the discharging station. According to the look up table, the threshold value of the touch signal is adjusted.

Figure 7:
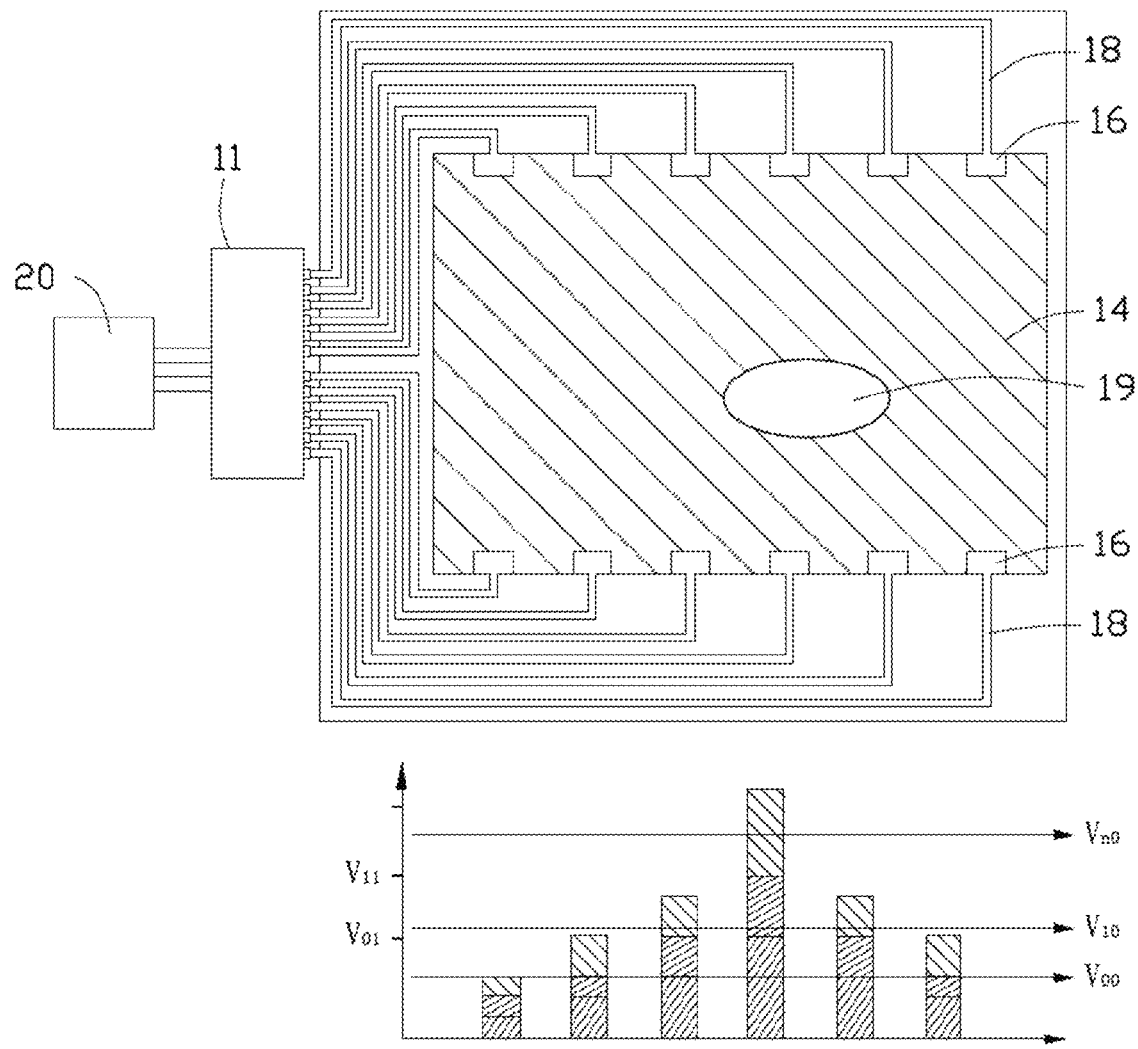
FIG. 7 is a schematic view of building a look up table in a charging station.

Referring to FIG. 2 and FIG. 7, an example illustrates how to build the charging station look up table. In the example, i=1 and m=0.

The device 20 detects the electrical quantity ($A_{01}$) at the moment (t), and the electrical quantity ($A_{01}$) is about 20 milliamps. The transparent layer 14 is touched at the moment (t), to obtain a sensing voltage ($V_{01}$) of the touch point 19. The sensing voltage ($V_{01}$) is about 2 volts. A threshold voltage ($V_{00}$) is set, and the threshold voltage ($V_{00}$) is set to about 1 volt.

The device 20 detects the electrical quantity ($A_{11}$) at the moment (t+1), and the electrical quantity ($A_{11}$) is about 30 milliamps. The transparent layer 14 is touched at the moment (t+1), to obtain a sensing voltage ($V_{11}$) of the touch point 19, the sensing voltage ($V_{11}$) is about 4 volts. Setting a threshold voltage ($V_{10}$), because $V_{01}-V_{00}=V_{11}-V_{10}$, the threshold voltage ($V_{10}$) is about 3 volts.

The equation $f_1$ meets the condition: $f_1(V_{01}, A_{01}, A_{11})=(4/3) \times V_{01}A_{11}/A_{01}=V_{11}$, because $A_{01}=20$, $V_{01}=2$, $A_{11}=30$, $V_{11}=4$, $L_{01} \times V_{01}A_{11}/A_{01}=V_{11}$, and $L_{01}=4/3$. The equation $f_2$ meets the condition: $f_2(V_{00}, V_{11}, V_{01})=(3/2) \times V_{00}V_{11}/V_{01}=V_{10}$, because $V_{00}=1$, $V_{01}=2$, $V_{10}=3$, $V_{11}=4$, $K_{01} \times V_{00}V_{11}/V_{01}=V_{10}$, and $K_{01}=3/2$. According to the equations $f_1$ and $f_2$, the computational method $g_1$ is obtained. The computational method $g_1$ meets the conditions: $(4/3) \times (3/2) \times V_{00}A_{n1}/A_{01}=2 \times V_{00}A_{n1}/A_{01}=V_{n0}$, n=0, 1, 2, 3 . . . (n≥0). Therefore, the charging station look up table includes the threshold voltage ($V_{00}$), the electrical quantity ($A_{01}$) corresponding to the threshold voltage ($V_{00}$), and the computational method $g_1$, wherein the computational method $g_1$ meets the condition: $g_1(V_{00}, A_{01})=2 \times V_{00}A_{n1}/A_{01}=V_{n0}$.

The device 20 detects the current electrical quantity ($A_{n1}$) of the capacitive touch panel 10 at the moment (t+n). The device 20 receives the signal of the charging station and the electrical quantity ($A_{n1}$) at the charging station. If the electrical quantity ($A_{01}$) is about 40 milliamps, according to the charging station look up table, the threshold value ($V_{n0}$) is adjusted to be about 4 volts.

Figure 8:
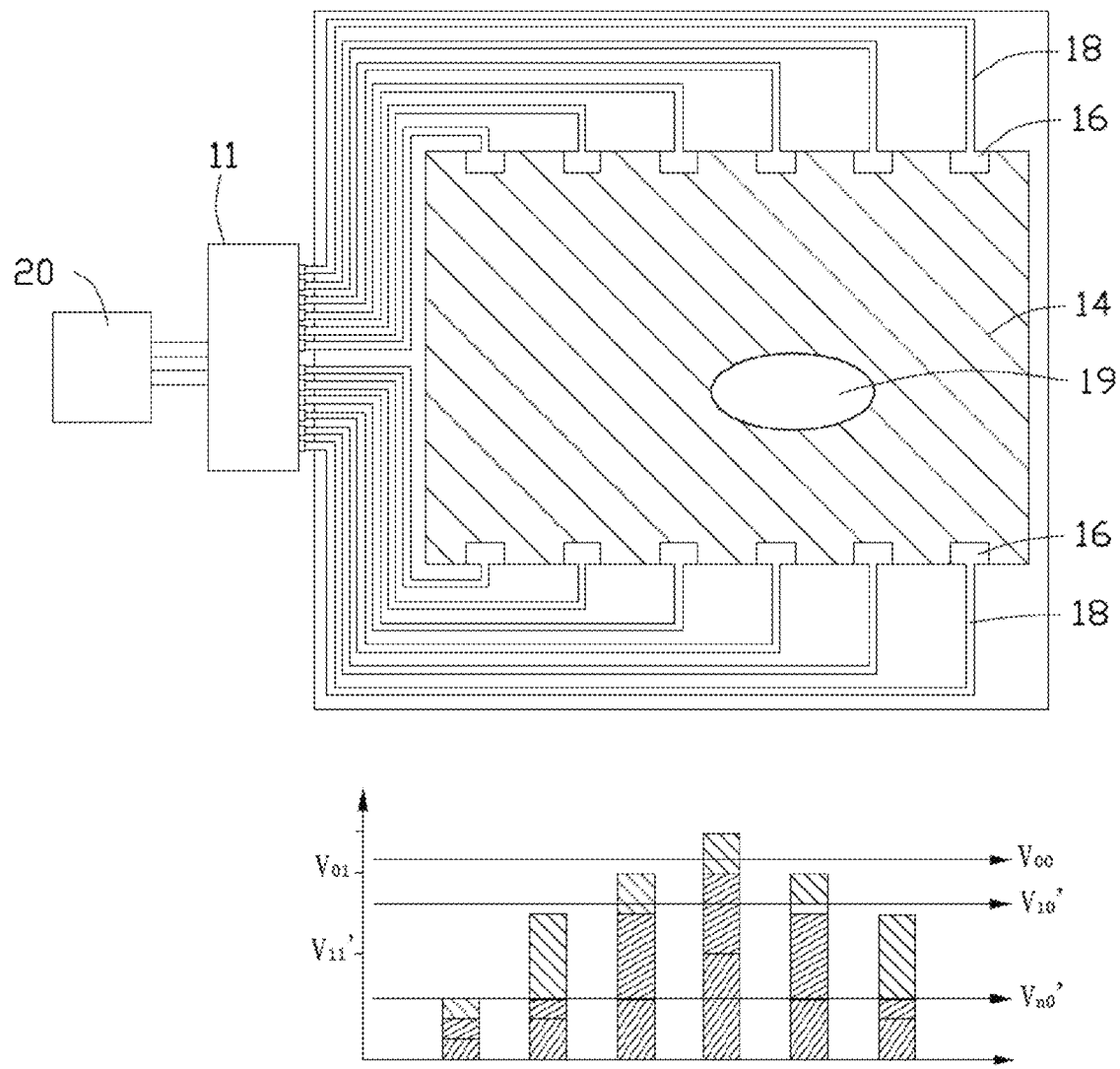
FIG. 8 is a schematic view of building a look up table in a discharging station.

Referring to FIG. 2 and FIG. 8, an example illustrates how to build the discharging station look up table. In the example, i=1 and m=0.

The device 20 detects the electrical quantity ($A_{01}$) at the moment (t), and the electrical quantity ($A_{01}$) is about 60 milliamps. The transparent layer 14 is touched at the moment (t), to obtain a sensing voltage ($V_{01}$) of the touch point 19. The sensing voltage ($V_{01}$) is about 5 volts. A threshold voltage ($V_{00}$) is set, and the threshold voltage ($V_{00}$) is set to about 4 volts.

The device 20 detects the electrical quantity ($A_{11}'$) at the moment (t+1), and the electrical quantity ($A_{11}'$) is about 50 milliamps. The transparent layer 14 is touched at the moment (t+1), to obtain a sensing voltage ($V_{11}'$) of the touch point 19. The sensing voltage ($V_{11}'$) is about 4.5 volts. A threshold voltage ($V_{10}'$) is set, because $V_{01}-V_{00}=V_{11}'-V_{10}'$, and the threshold voltage ($V_{10}'$) is about 3.5 volts.

The equation $f_1'$ meets the condition: $f_1'(V_{01}, A_{01}, A_{11}') = (54/50) \times V_{01} A_{11}'/A_{01} = V_{11}'$, because $A_{11}'=50$, $A_{01}=60$, $V_{11}'=4.5$, $V_{01}=5$, and $M_{01} \times A_{11}'/A_{01}=V_{11}'/V_{01}$, $M_{01}=54/50$. The equation $f_2'$ meets the conditions: $f_2'(V_{00}, V_{11}', V_{01})=(35/36) \times V_{00} V_{11}'/V_{01}=V_{10}'$, because $V_{11}'=4.5$, $V_{01}=5$, $V_{10}'=3.5$, $V_{00}=4$, and $N_{01} \times V_{00} V_{11}'/N_{01}=V_{10}'$, $N_{01}=35/36$. According to the equations $f_1'$ and $f_2'$, the computational method $g_2$ is obtained. The computational method $g_2$ meets the conditions: $(54/50) \times (35/36) \times V_{00} A_{n1}'/A_{01}=(105/4) \times V_{00} A_{n1}'/A_{01}=V_{n0}'$, $n=0, 1, 2, 3 \ldots (n \geq 0)$. Therefore, the discharging station look up table includes the threshold voltage ($V_{00}$), the electrical quantity ($A_{01}$) corresponding to the threshold voltage ($V_{00}$), and the computational method $g_2$, wherein the computational method $g_2$ meets the conditions: $g_2(V_{00}, A_{01})=(21/20) \times V_{00} A_{n1}'/A_{01}=V_{n0}'$.

The device 20 detects an electrical quantity ($A_{n1}'$) of the capacitive touch panel 10 at the moment (t+n). The device 20 receives the signal of discharging station and the electrical quantity ($A_{n1}'$) at the discharging station. If the electrical quantity ($A_{01}'$) is about 40 milliamps, according to the discharging station look up table, the threshold value ($V_{n0}'$) is adjusted to be about 2.8 volts.

The equations $f_1$, $f_2$, $f_1'$, and $f_2'$ can be built using various algorithms, for example, a ratio, a difference value, or more complex forms. Building the equations $f_1$, $f_2$, $f_1'$, and $f_2'$ can be based on the electrical quantity, sensing signal of the touch point 19, and the threshold voltage corresponding to the sensing signal at different moments. With the electrical quantity, sensing signal of the touch point 19, and the threshold voltage corresponding to the sensing signal at more moments, the equation $f_1$, $f_2$, $f_1'$, and $f_2'$ can be accurately determined. Therefore, the computational method $g_1$ and $g_2$ are more accurate.

In summary, the current electrical quantity and where the capacitive touch panel 10 is charging are detected. The threshold value of the touch signal is changed by querying the look up table. The look up table can be built in advance on the external controller 11. Therefore, with the changing of the strength of the touch signal, the threshold value corresponding to the strength of the touch signal can be adjusted. The sensitivity of the capacitive touch panel 10 can be also adjusted.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for adjusting a sensitivity of a capacitive touch panel, the method comprising:

building a look up table comprising a charging station look up table and a discharging station look up table, wherein the charging station look up table comprises a threshold value ($V_{0m}$) of a touch signal, an electrical quantity ($A_{0i}$) corresponding to the threshold value ($V_{0m}$), and a computational method $g_1$; and the discharging station look up table comprises the threshold value ($V_{0m}$), the electrical quantity ($A_{0i}$), and a computational method $g_2$, wherein building the charging station look up table comprises:

detecting the electrical quantity ($A_{0i}$) at a moment (t) and touching the capacitive touch panel at the moment (t) to obtain a sensing signal ($V_{0i}$) of a touch point, wherein the sensing signal ($V_{0i}$) is set greater than a threshold value ($V_{0m}$);

detecting an electrical quantity ($A_{1i}$) at a next moment (t+1), and touching the capacitive touch panel at the next moment (t+1), to obtain a sensing signal ($V_{1i}$) of the touch point, wherein the sensing signal ($V_{1i}$) is set greater than a threshold value ($V_{1m}$), the electrical quantity ($A_{1i}$) at the moment (t+1) is greater than the electrical quantity ($A_{0i}$) at the moment (t), and $V_{0i}-V_{0m}=V_{1i}-V_{1m}$; and building an equation $f_1$ meeting a condition $f_1(V_{0i}, A_{0i}, A_{1i})=V_{1i}$, and building an equation $f_2$ meeting a condition $f_2(V_{0m}V_{1i},V_{0i})=V_{1m}$, to obtain the computational method $g_1$, wherein an electrical quantity of a moment (t+n) is defined as $A_{ni}$, threshold value at the moment (t+n) as $V_{nm}$, the computational method $g_1$ meets the conditions: $g_1(V_{0m}A_{0i}, A_{ni})=V_{nm}$;

detecting a current electrical quantity;

determining whether the capacitive touch panel is charging; and adjusting the threshold value ($V_{0m}$), according to the current electrical quantity, the state of charging or discharging, and the computational method $g_1$ or $g_2$.

2. The method of claim 1, wherein the equation $f_1$ is represented by $$\frac{L_{0i} \times V_{0i} \times A_{1i}}{A_{0i}} = V_{1i},$$

$L_{0i}$ is a coefficient of $$\frac{V_{0i} \times A_{1i}}{A_{0i}}$$

for converting into $V_{1i}$; the equation $f_2$ is represented by $$\frac{K_{0i} \times V_{0m} \times V_{1i}}{V_{0i}} = V_{1m},$$

and $K_{0i}$ is a coefficient of $$\frac{V_{0m} \times V_{1i}}{V_{0i}}$$

for converting into $V_{1m}$.

3. The method of claim 1, wherein the computational method $g_1(V_{0m}, A_{0i}, A_{ni})$ meets a condition $$\frac{L_{0i} \times K_{0i} \times V_{0m} \times A_{ni}}{A_{0i}} = V_{nm}.$$

4. The method of claim 1, wherein building the discharging station look up table comprises:
   detecting the electrical quantity ($A_{0i}$) at the moment (t), and touching the capacitive touch panel at the moment (t), to obtain the sensing signal ($V_{0i}$) of a touch point, wherein the sensing signal ($V_{0i}$) is set greater than the threshold value ($V_{0m}$);
   detecting an electrical quantity ($A_{1i}'$) at the next moment (t+1), and touching the capacitive touch panel at the next moment (t+1), to obtain a sensing signal ($V_{1i}'$) of the touch point, wherein the sensing signal ($V_{1i}'$) is set greater than a threshold value ($V_{1m}'$), the electrical quantity ($A_{0i}$) at the moment (t) is greater than the electrical quantity ($A_{1i}'$) at the moment (t+1), and $V_{0i} - V_{0m} = V_{1i}' - V_{1m}'$; and
   building an equation $f_1'$ and an equation $f_2'$, the equation meeting a condition: $f_1'$, $(V_{0i}, A_{0i}, A_{1i}') = V_{1i}'$, the equation $f_2'$ meeting a condition $f_2'(V_{0m}, V_{1i}', V_{0i}) = V_{1m}'$, wherein an electrical quantity at a moment (t+n) is defined as $A_{ni}'$, a threshold value at the moment (t+n) is defined as $V_{nm}'$, and the computational method $g_2$ meets a conditions: $g_2(V_{0m}, A_{0i}, A_{ni}') = V_{nm}'$.

5. The method of claim 4, wherein the equation $f_1'$ is represented by $$\frac{M_{0i} \times V_{0i} \times A_{1i}'}{A_{0i}} = V_{1i}',$$

$M_{0i}$ is a coefficient of $$\frac{V_{0i} \times A_{1i}'}{A_{0i}}$$

for converting into $V_{1i}'$; the equation $f_2'$ is represented by $$\frac{N_{0i} \times V_{0m} \times V_{1i}'}{V_{0i}} = V_{1m}',$$

and $N_{0i}$ is a coefficient of $$\frac{V_{0m} \times V_{1i}'}{V_{0i}}$$

for converting into $V_{1m}'$.

6. The method of claim 4, wherein the computational method $g_2$ meets a condition $$\frac{M_{0i} \times N_{0i} \times V_{0m} \times A_{ni}'}{A_{0i}} = V_{nm}'.$$

7. The method of claim 1, wherein the threshold value and the sensing signal are voltage values or capacitance values.

8. The method of claim 1, wherein the capacitive touch panel comprises a transparent conductive layer, and the transparent conductive layer is a carbon nanotube layer, a conductive indium tin oxide layer, or a conductive antimony tin oxide layer.

* * * * *